United States Patent
Wang

(10) Patent No.: US 8,665,410 B2
(45) Date of Patent: Mar. 4, 2014

(54) LIQUID CRYSTAL DISPLAY PANEL AND ITS MANUFACTURING METHOD

(75) Inventor: Jun Wang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 119 days.

(21) Appl. No.: 13/376,608

(22) PCT Filed: Oct. 12, 2011

(86) PCT No.: PCT/CN2011/080683
§ 371 (c)(1),
(2), (4) Date: Dec. 7, 2011

(87) PCT Pub. No.: WO2013/040815
PCT Pub. Date: Mar. 28, 2013

(65) Prior Publication Data
US 2013/0077030 A1    Mar. 28, 2013

(30) Foreign Application Priority Data
Sep. 22, 2011    (CN) .......................... 2011 1 0283894

(51) Int. Cl.
G02F 1/1339    (2006.01)

(52) U.S. Cl.
USPC .......................................... 349/153; 349/190

(58) Field of Classification Search
None
See application file for complete search history.

(56) References Cited

U.S. PATENT DOCUMENTS

2006/0103802 A1*   5/2006   Miki et al. ..................... 349/153
2008/0297714 A1*  12/2008   Yanagawa et al. ............ 349/153
2009/0237607 A1*   9/2009   Hosokawa .................... 349/153

* cited by examiner

Primary Examiner — Thanh-Nhan P Nguyen

(57) ABSTRACT

The present invention discloses a liquid crystal display panel which comprises a color filter substrate and an array substrate, and further comprises a conductive sealant for bonding the color filter substrate and the array substrate. The conductive sealant includes a sealing adhesive and conductive particles, the conductive particle includes an organic resin core and a conductive coating of carbon nanotubes or graphene, the conductive coating is coated on the organic resin core, and the conductive particles are evenly distributed in the sealing adhesive. The present invention further discloses a manufacturing method of a liquid crystal display panel.

10 Claims, 4 Drawing Sheets

LIQUID CRYSTAL DISPLAY PANEL AND ITS MANUFACTURING METHOD

BACKGROUND OF THE INVENTION

1. Field of Invention

The present invention relates to a field of liquid crystal display technology and more particularly to a liquid crystal display panel and its manufacturing method.

2. Related Art

As liquid crystal display (LCD) is becoming more popular, users are getting more demands on the functions of LCD.

Referring to FIG. 1, in a manufacturing process of a LCD panel, a sealant 11 is mainly used to bond a color filter substrate 13 with an array substrate 12, while a conductive adhesive 14 is mainly used to realize a conductive function between the array substrate 12 and the color filter substrate 13. The sealant 11 and the conductive adhesive 14 are usually separated.

Referring to FIG. 1, after the sealant 11 is placed on the array substrate 12, the color filter substrate 13 is then pressed against on the array substrate 12, so that the color filter substrate 13 is adhered on the array substrate 12 by the sealant 11. Because there is no hard object disposed between the color filter substrate 13 and the array substrate 12 to act as a support, and the sealant 11 is non-conductive; thus with a strong electrostatic attraction or under an effect of atmospheric pressure, the sealant 11 will deform to a large extent and causes uneven thicknesses of cells after the liquid crystal cells for the panel are formed, thus result in a Mura effect which will affect the display effect of the liquid crystal display.

In addition, because the sealant 11 and the conductive adhesive 14 are closed to each other, the sealant 11 and the conductive adhesive 14 will be easily overlapped with each other during coating, and there is more amount of the sealant 11 in the overlapping areas which will make the heights of the overlapping areas high than that of other areas, and result in uneven thicknesses of the cells and the Mura effect. Furthermore, the electricity conductive effect will be affected if positions of coating of the sealant 11 and the conductive adhesive 14 are offset too much, thus the display effect of the liquid crystal display is affected as well.

As a conclusion from the above mentioned, the Mura effect caused by uneven thicknesses of the liquid crystal display panel because of a low rigidity of the sealant which is coated separately from the conductive adhesive, and the poor conductive effect when the sealant and the conductive adhesive are coated far away from each other, are the problems needed to be studied and researched in existing liquid crystal display techniques.

SUMMARY OF THE INVENTION

An object of the present invention is to provide a liquid crystal display (LCD) panel to solve the technical problems in existing liquid crystal display techniques, which are the Mura effect caused by uneven thicknesses of the liquid crystal display panel because of a low rigidity of the sealant which is coated separately from the conductive adhesive, and the poor conductive effect when the sealant and the conductive adhesive are coated far away from each other.

In order to solve the abovementioned problems, the present invention provides a liquid crystal display panel which comprises a color filter substrate and an array substrate, and further comprises a conductive sealant for bonding the color filter substrate and the array substrate, the conductive sealant includes a sealing adhesive and conductive particles, the conductive particles are distributed evenly in the sealing adhesive;

the conductive particles include organic resin (globular) cores and conductive coatings of carbon nanotubes or graphene, the conductive coatings are coated on the organic resin cores;

a thickness range of the conductive coating of the conductive particle after agglomeration is from 1.5 to 7 microns (μm), and a range of volume ratio of the conductive coating to the organic resin core of the conductive particle is from 30%:70% to 90%:10%.

Another object of the present invention is to provide a liquid crystal display panel to solve the technical problems in existing liquid crystal display techniques, which are the Mura effect caused by uneven thicknesses of the liquid crystal display panel because of a low rigidity of the sealant which is coated separately from the conductive adhesive, and the poor conductive effect when the sealant and the conductive adhesive are coated far away from each other.

In order to solve the abovementioned problems, the present invention provides a liquid crystal display panel which comprises a color filter substrate and an array substrate, and further comprises a conductive sealant for bonding the color filter substrate and the array substrate, the conductive sealant includes a sealing adhesive and conductive particles, the conductive particles include organic resin cores and conductive coatings of carbon nanotubes or graphene, the conductive coatings are coated on the organic resin cores, the conductive particles are distributed evenly in the sealing adhesive.

In the liquid crystal display panel of the present invention, a thickness range of the conductive coating of the conductive particle after agglomeration is from 1.5 to 7 microns (μm).

In the liquid crystal display panel of the present invention, a range of volume ratio of the conductive coating to the organic resin core of the conductive particle is from 30%:70% to 90%:10%.

Yet another object of the present invention is to provide a manufacturing method of a liquid crystal display panel to solve the technical problems in existing liquid crystal display techniques, which are the Mura effect caused by uneven thicknesses of the liquid crystal display panel because of a low rigidity of the sealant which is coated separately from the conductive adhesive, and the poor conductive effect when the sealant and the conductive adhesive are coated far away from each other.

In order to solve the abovementioned problems, the present invention provides a manufacturing method of a liquid crystal display panel, the manufacturing method includes the following steps of:

providing a color filter substrate and an array substrate;

coating a conductive adhesive on the array substrate to form a conductive sealant, wherein the conductive sealant includes a sealing adhesive and conductive particles, the conductive particles include organic resin cores and conductive coatings of carbon nanotubes or graphene, the conductive coatings are coated on the organic resin cores, and the conductive particles are distributed evenly in the sealing adhesive; and pressing the color filter substrate on the array substrate, so that the color filter substrate and the array substrate are bonded together by the conductive sealant.

In the liquid crystal display panel of the present invention, a thickness range of the conductive coating of the conductive particle after agglomeration is from 1.5 to 7 microns (μm).

In the liquid crystal display panel of the present invention, a range of volume ratio of the conductive coating to the organic resin core of the conductive particle is from 30%:70% to 90%:10%.

Yet another object of the present invention is to provide a manufacturing method of a liquid crystal display panel to solve the technical problems in existing liquid crystal display techniques, which are the Mura effect caused by uneven thicknesses of the liquid crystal display panel because of a low rigidity of the sealant which is coated separately from the conductive adhesive, and the poor conductive effect when the sealant and the conductive adhesive are coated far away from each other.

In order to solve the abovementioned problems, the present invention provides a manufacturing method of a liquid crystal display panel, the manufacturing method includes the following steps of:

providing a color filter substrate and an array substrate;

coating a conductive adhesive on the color filter substrate to form a conductive sealant, wherein the conductive sealant includes a sealing adhesive and conductive particles, the conductive particles include organic resin cores and conductive coatings of carbon nanotubes or graphene, the conductive coatings are coated on the organic resin cores, and the conductive particles are distributed evenly in the sealing adhesive; and pressing the array substrate on the color filter substrate, so that the color filter substrate and the array substrate are bonded together by the conductive sealant.

In the liquid crystal display panel of the present invention, a thickness range of the conductive coating of the conductive particle after agglomeration is from 1.5 to 7 microns (μm).

In the liquid crystal display panel of the present invention, a range of volume ratio of the conductive coating to the organic resin core of the conductive particle is from 30%:70% to 90%:10%.

Comparing with existing techniques, the present invention solves the technical problems in the existing techniques, which are the Mura effect caused by uneven thicknesses of the liquid crystal display panel because of a low rigidity of the sealant which is coated separately from the conductive adhesive and the poor conductive effect when the sealant and the conductive adhesive are coated far away from each other, therefore the picture display quality of the liquid crystal display is enhanced.

The structure and the technical means adopted by the present invention to achieve the above and other objects can be best understood by referring to the following detailed description of the preferred embodiment and the accompanying drawings, but should not be construed as limitations thereof.

DETAILED DESCRIPTION OF THE INVENTION

The following description of the preferred embodiments is referring to the accompanying drawings to exemplify specific practicable embodiments of the present invention.

Figure 1:
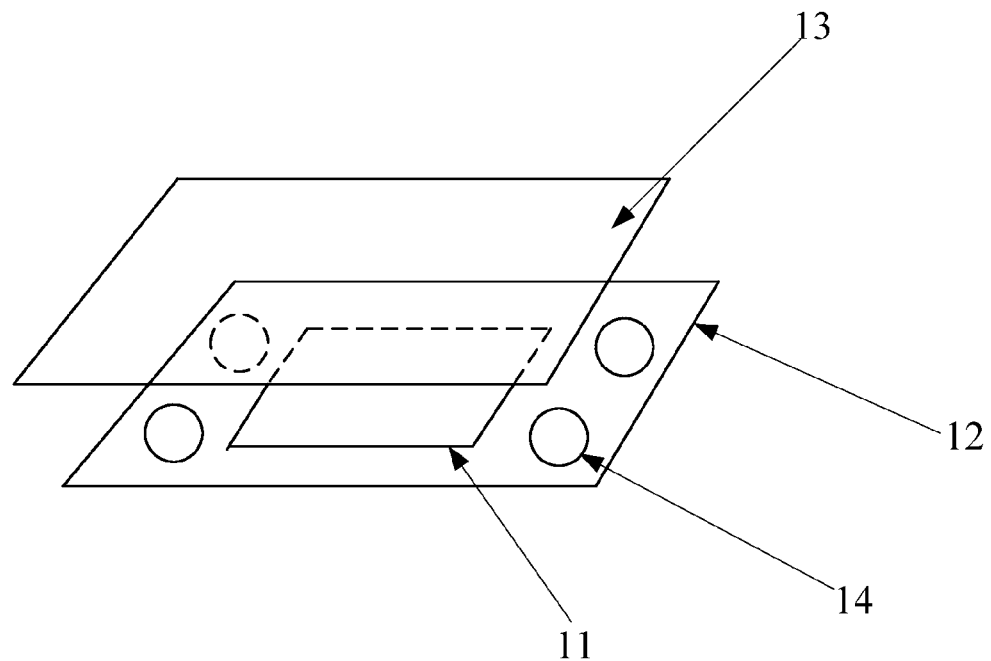
FIG. 1 is an illustration of a structure of a liquid crystal display panel of an existing technology.
Figure 2:
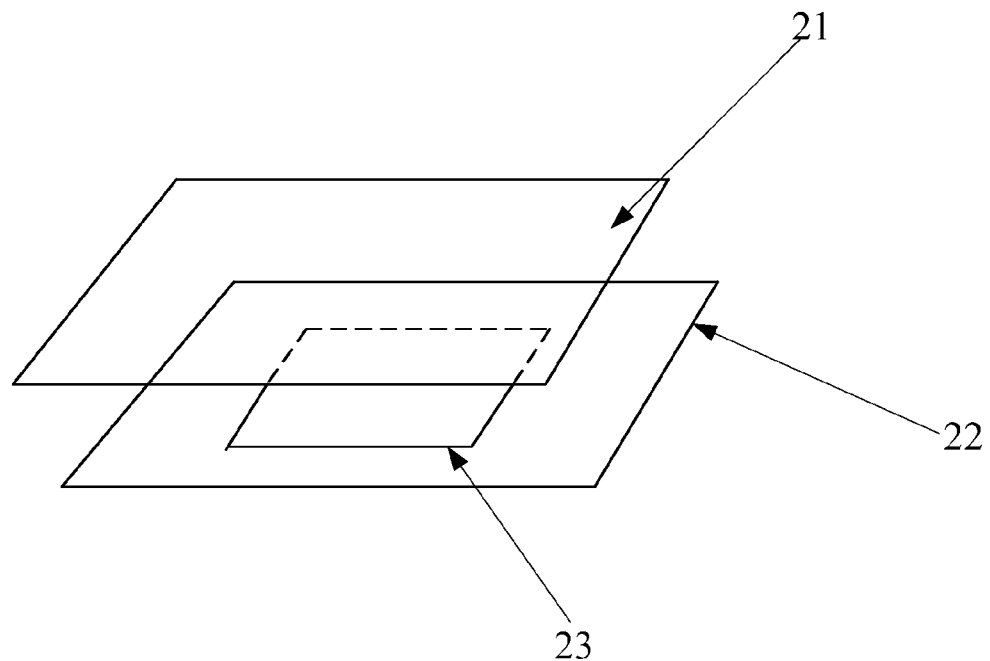
FIG. 2 is an illustration of a structure of a liquid crystal display panel of a preferred embodiment of the present invention.

Referring to FIG. 2, it illustrates a structure of a liquid crystal display panel of a preferred embodiment of the present invention.

The liquid crystal display panel comprises a color filter substrate 21 and an array substrate 22, and further comprises a conductive sealant 23, wherein the color filter substrate 21 and the array substrate 22 are bonded together by the conductive sealant 23.

Figure 3:
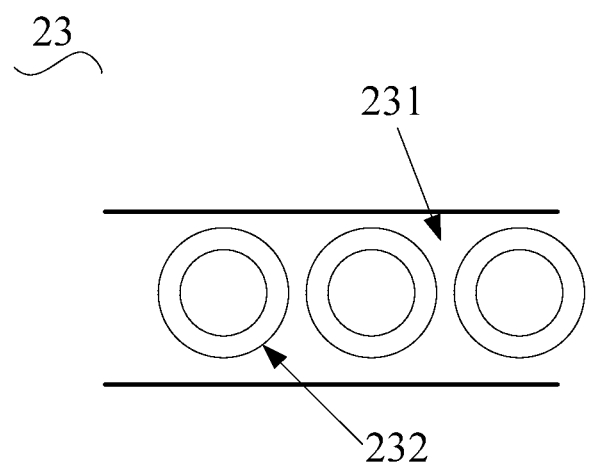
FIG. 3 is an illustration of a structure of a conductive sealant of the preferred embodiment of the present invention.

Referring to FIG. 3, it is an illustration of a structure of the conductive sealant 23 of the preferred embodiment in FIG. 2.

The conductive sealant 23 includes a sealing adhesive 231 and conductive particles 232, wherein the conductive particles 232 are distributed evenly in the sealing adhesive 231.

Figure 4:
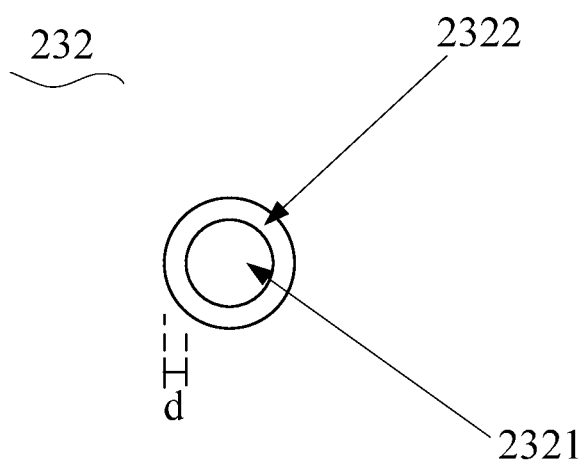
FIG. 4 is an illustration of a structure of a conductive particle of the preferred embodiment of the present invention.

Referring to FIG. 4, it is an illustration of a structure of the conductive particle 232 of the preferred embodiment in FIG. 3.

The conductive particle 232 includes an organic resin core 2321 and a conductive coating 2322, the conductive coating 2322 is coated on the organic resin core 2321, in this embodiment, the conductive coating 2322 is a film formed by an agglomeration/aggregation of carbon nanotube or graphene agglomerates.

The best range for a thickness "d" of the conductive coating 2322 of the conductive particle 232 after agglomeration is from 1.5 to 7 microns.

During an embodied process, a range of volume ratio of the conductive coating 2322 to the organic resin core 2321 of the conductive particle 232 is from 30%:70% to 90%:10%.

Because the conductive coating 2322 is composed of the carbon nanotubes or graphene which not only has an excellent conductive performance, but also has a certain strength and elasticity, thus the conductive particle 232 provided by the embodiment of the present invention not only can conduct electricity, but also has a certain strength and rigidity.

The conductive sealant 23 provided by the embodiment of the present invention includes the conductive particle 232 provided by the embodiment of the present invention, and because the conductive coating 2322 of the conductive particle 232 includes the carbon nanotubes or graphene, thus the conductive sealant 23 provided by the embodiment of the present invention not only can conduct electricity, but also has a certain strength and rigidity.

According to the liquid crystal display panel provided by the embodiment of the present invention, by having the color filter substrate 21 and the array substrate 22 bonded together by the conductive sealant 23, and because the conductive sealant 23 not only can conduct electricity, but also has a certain strength and rigidity which can support the color filter substrate 21 or the array substrate 22, thus a thickness of a product formed by bonding the color filter substrate 21 and the array substrate 22 is even and the Mura effect will not occur.

Furthermore, according to the liquid crystal display panel provided by the embodiment of the present invention, by having the color filter substrate 21 and the array substrate 22 bonded together by the conductive sealant 23, and because the conductive sealant 23 can conduct electricity and provide support, so that the poor conductive effect in the existing techniques caused by a far distance between the sealant and the conductive adhesive can be solved, the picture display quality of the liquid crystal display panel can be further enhanced, the manufacturing process is simplified effectively and the production costs are reduced.

Figure 5:
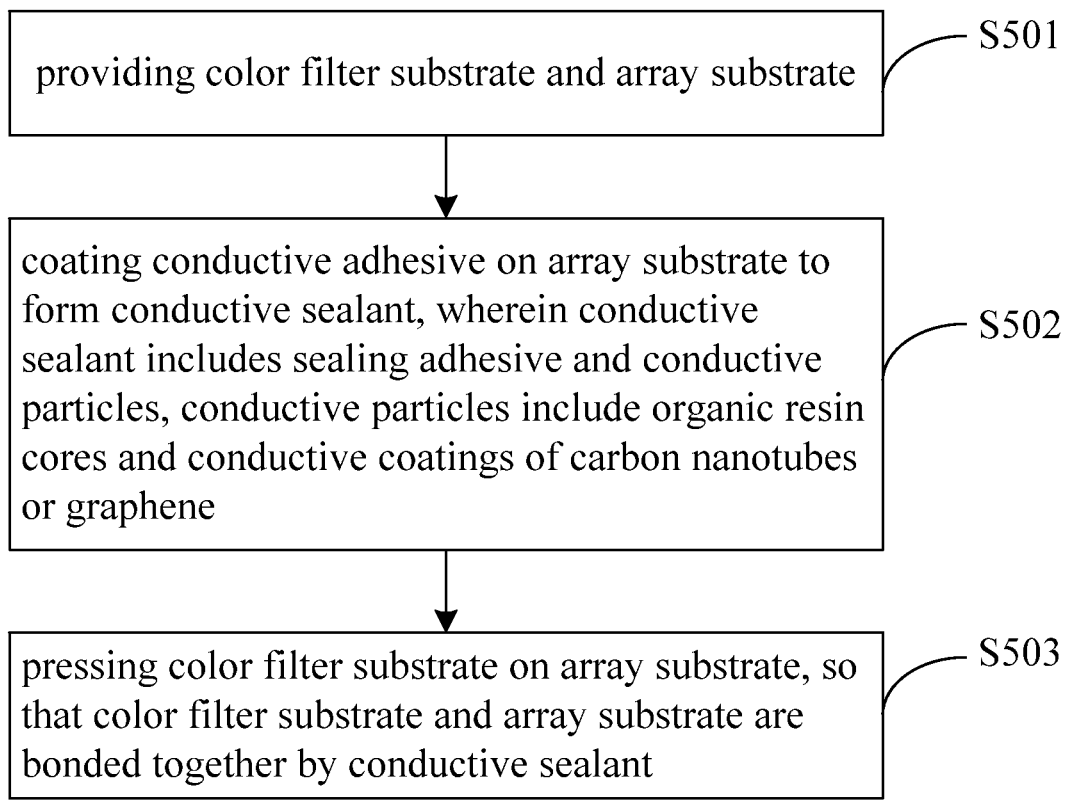
FIG. 5 is a flowchart of a manufacturing method of a liquid crystal display panel of a first preferred embodiment of the present invention.

Referring to FIG. 5, it is a flowchart of a manufacturing method of a liquid crystal display panel of a first preferred embodiment of the present invention.

In a step S501, providing a color filter substrate and an array substrate.

In a step S502, coating a conductive adhesive on the array substrate to form a conductive sealant, wherein the conductive sealant includes a sealing adhesive and conductive particles, the conductive particles include organic resin cores and conductive coatings of carbon nanotubes or graphene, the conductive coatings are coated on the organic resin cores, and the conductive particles are distributed evenly in the sealing adhesive.

In a step S503, pressing the color filter substrate on the array substrate, so that the color filter substrate and the array substrate are bonded together by the conductive sealant.

Preferably, the range for a thickness of the conductive coating of the conductive particle after agglomeration is from 1.5 to 7 microns.

In an embodied process, a range of volume ratio of the conductive coating to the organic resin core of the conductive particle is from 30%:70% to 90%:10%.

Figure 6:
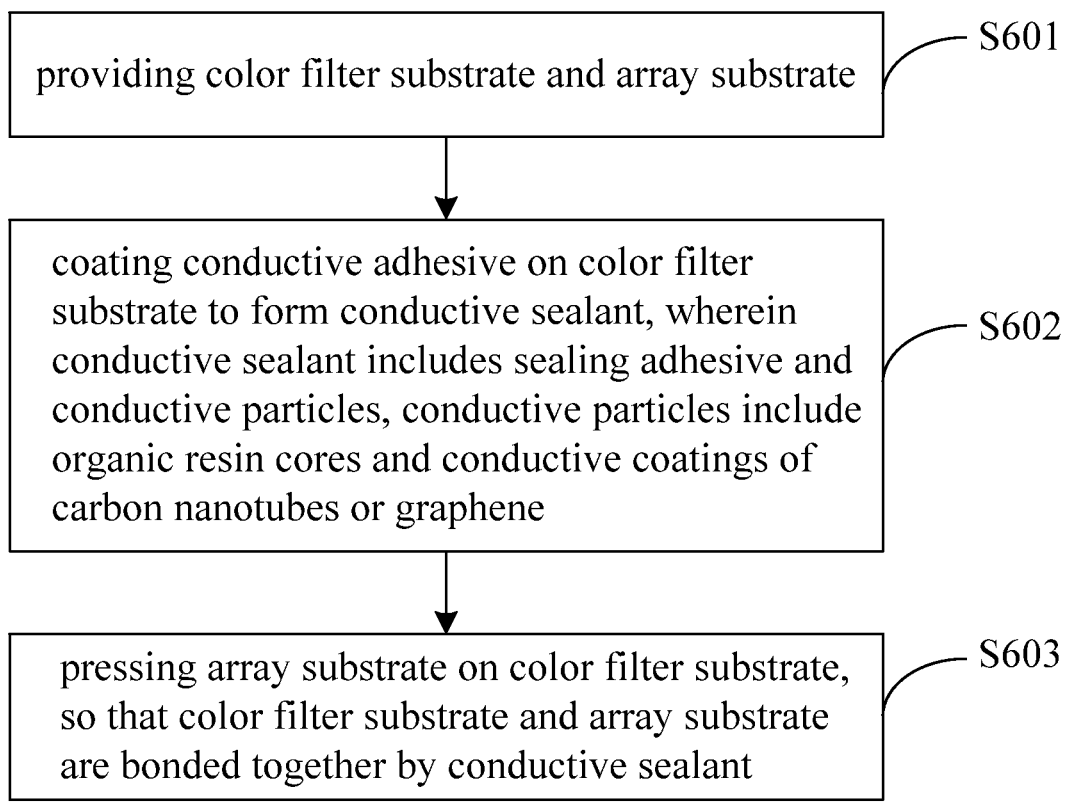
FIG. 6 is a flowchart of a manufacturing method of a liquid crystal display panel of a second preferred embodiment of the present invention.

Referring to FIG. 6, it is a flowchart of a manufacturing method of a liquid crystal display panel of a second preferred embodiment of the present invention.

In a step S601, providing a color filter substrate and an array substrate.

In a step S602, coating a conductive adhesive on the color filter substrate to form a conductive sealant, wherein the conductive sealant includes a sealing adhesive and conductive particles, the conductive particles include organic resin cores and conductive coatings of carbon nanotubes or graphene, the conductive coatings are coated on the organic resin cores, and the conductive particles are distributed evenly in the sealing adhesive.

In a step S603, pressing the array substrate on the color filter substrate, so that the color filter substrate and the array substrate are bonded together by the conductive sealant.

Preferably, the range for a thickness of the conductive coating of the conductive particle after agglomeration is from 1.5 to 7 microns.

In an embodied process, a range of volume ratio of the conductive coating to the organic resin core of the conductive particle is from 30%:70% to 90%:10%.

Please refer to the above context for the descriptions of the conductive sealant and the conductive particles involved in the methods of the two preferred embodiments mentioned above, as they will not be mentioned here again.

According to the liquid crystal display panel produced using the manufacturing method of the liquid crystal display panel provided by the embodiment of the present invention, because the conductive sealant can conduct electricity and provide support, thus the thicknesses of the cells of the liquid crystal display panel are even and the picture display quality can be further enhanced, the manufacturing process is simplified effectively and the production costs are reduced.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A liquid crystal display panel, comprising a color filter substrate and an array substrate, characterized in that: further comprising a conductive sealant bonding the color filter substrate and the array substrate, wherein the conductive sealant includes a sealing adhesive and non-metallic conductive particles, and the non-metallic conductive particles are distributed evenly in the sealing adhesive;

wherein the non-metallic conductive particle includes an organic resin core and a conductive coating made of carbon nanotubes or graphene, the conductive coating is coated on the organic resin core;

wherein a thickness range of the conductive coating of the non-metallic conductive particle after agglomeration is from 1.5 to 7 microns, and a range of volume ratio of the conductive coating to the organic resin core of the non-metallic conductive particle is from 30%: 70% to 90%: 10%.

2. A liquid crystal display panel, comprising a color filter substrate and an array substrate, characterized in that: further comprising a conductive sealant bonding the color filter substrate and the array substrate, wherein the conductive sealant includes a sealing adhesive and non-metallic conductive particles, the non-metallic conductive particle includes an organic resin core and a conductive coating made of carbon nanotubes or graphene, the conductive coating is coated on the organic resin core, and the non-metallic conductive particles are distributed evenly in the sealing adhesive.

3. The liquid crystal display panel as claimed in claim 2, characterized in that: a thickness range of the conductive coating of the conductive particle after agglomeration is from 1.5 to 7 microns.

4. The liquid crystal display panel as claimed in claim 2, characterized in that: a range of volume ratio of the conductive coating to the organic resin core of the conductive particle is from 30%: 70% to 90%: 10%.

5. A manufacturing method of a liquid crystal display panel, characterized in that: the method includes following steps of:

providing a color filter substrate and an array substrate;

coating a conductive adhesive on the array substrate to form a conductive sealant, wherein the conductive sealant includes a sealing adhesive and non-metallic conductive particles, the non-metallic conductive particle includes an organic resin core and a conductive coating of carbon nanotubes or graphene, the conductive coating is coated on the organic resin core, and the non-metallic conductive particles are distributed evenly in the sealing adhesive; and pressing the color filter substrate on the array substrate, so that the color filter substrate and the array substrate are bonded together by the conductive sealant.

6. The manufacturing method of the liquid crystal display panel as claimed in claim 5, characterized in that: a thickness range of the conductive coating of the conductive particle after agglomeration is from 1.5 to 7 microns.

7. The manufacturing method of the liquid crystal display panel as claimed in claim 5, characterized in that: a range of volume ratio of the conductive coating to the organic resin core of the conductive particle is from 30%: 70% to 90%: 10%.

8. A manufacturing method of a liquid crystal display panel, characterized in that: the method includes following steps:

providing a color filter substrate and an array substrate;
coating a conductive adhesive on the color filter substrate to form a conductive sealant, wherein the conductive sealant includes a sealing adhesive and non-metallic conductive particles, the non-metallic conductive particle includes an organic resin core and a conductive coating of carbon nanotubes or graphene, the conductive coating is coated on the organic resin core, and the non-metallic conductive particles are distributed evenly in the sealing adhesive; and
pressing the array substrate on the color filter substrate, so that the color filter substrate and the array substrate are bonded together by the conductive sealant.

9. The manufacturing method of the liquid crystal display panel as claimed in claim 8, characterized in that: a thickness range of the conductive coating of the conductive particle after agglomeration is from 1.5 to 7 microns.

10. The manufacturing method of the liquid crystal display panel as claimed in claim 8, characterized in that: a range of volume ratio of the conductive coating to the organic resin core of the conductive particle is from 30%: 70% to 90%: 10%.

\* \* \* \* \*